United States Patent [19]
Wagle

[11] 3,765,168
[45] Oct. 16, 1973

[54] WATER RECOVERY

[75] Inventor: Joseph A. Wagle, Indianapolis, Ind.

[73] Assignee: General Motors Corporation, Detroit, Mich.

[22] Filed: Aug. 24, 1972

[21] Appl. No.: 283,476

[52] U.S. Cl............ 60/39.02, 55/DIG. 17, 60/39.54, 60/39.58, 60/39.66, 62/92, 165/111, 417/366
[51] Int. Cl............................ F02c 3/06, F02c 7/16
[58] Field of Search .........60/39.02–39.06, 39.66, 60/39.53, 39.54, 39.58, 39.17; 62/93, 92; 165/111; 417/366, 408; 55/421, DIG. 17

[56] References Cited
UNITED STATES PATENTS

| | | | |
|---|---|---|---|
| 2,586,002 | 2/1952 | Carson et al.................. | 55/DIG. 17 |
| 2,786,341 | 3/1957 | Green............................ | 55/DIG. 17 |
| 2,839,900 | 6/1958 | Green............................ | 60/39.66 |
| 2,970,437 | 2/1961 | Anderson...................... | 60/39.66 |

Primary Examiner—Carlton R. Croyle
Assistant Examiner—Robert E. Garrett
Attorney—Paul Fitzpatrick et al.

[57] ABSTRACT

A system and method for recovering clean water from the air flowing into and through a gas turbine engine. Low pressure air drawn from the engine compressor is fed to a receiver. Compressed air from a higher stage of the compressor is cooled by atmospheric air which may be previously spray-cooled. The compressed air is further cooled by heat exchange with exhaust air from the system, and then expanded to further cool the air and lower its pressure. The two flows of air are then mixed in a receiver about 0°C. to precipitate water from the mixed air flow. The water collected in the receiver is used for cooling the turbine of the engine and also, if desired, for spray cooling the atmospheric air referred to above. The air discharged from the receiver is used to cool the compressed air and then discharged to exhaust.

6 Claims, 2 Drawing Figures

PATENTED OCT 16 1973 3,765,168

WATER RECOVERY

My invention is directed to a system for recovering water free of mineral contaminants from the air flowing through a gas turbine engine and making the water available for cooling the turbine of the engine.

The effort to maintain high maximum temperatures in a gas turbine engine to promote efficiency of the engine has led to many disclosures of arrangements for cooling the turbine. Most commonly, the turbine of such an engine is cooled by air taken from the compressor of the engine. Such air is relatively warm to begin with, and quite substantial quantities of air are diverted from the engine cycle for cooling. This diversion of air degrades engine efficiency at the same time the higher temperature enhances it, so that there is a considerable penalty to be paid for the cooling.

There have also been many proposals to use some system of water evaporation for turbine cooling. While such systems are promising from the standpoint of cycle efficiency, the quantities of water required are quite substantial. In a stationary installation where the power plant can be fed with water from a main supply, it is no problem; but in other installations, such as those in moving vehicles, it becomes a problem. One example, of course, is helicopter installations in which ordinarily a great part of the operation is at rather low altitudes. Others could be in a road vehicle or earthworking machine.

Water to be used for turbine cooling must be clean in the sense that it should have no mineral content which would leave residues upon evaporation of the water. One example of such demineralized water is rain water.

My invention is directed to a method and apparatus for condensing water from the air flowing into a gas turbine engine, which water will have the characteristics of rain water and will be essentially mineral free.

The principal objects of my invention are to provide a supply of clean water for use in cooling a gas turbine power plant, to provide a feasible method and a practical apparatus for obtaining such water, and to provide a turbine cooling system which exacts a relatively small bleed penalty in return for the benefits of the turbine cooling.

Briefly and generally stated, according to my invention compressed air taken from the engine compressor is cooled by heat exchange with atmospheric air and then by heat exchange with previously cooled air, and finally by expansion to provide quite cold air, ordinarily somewhat below 0°C. This air is mixed in a receiver with low pressure air derived from a low pressure stage of the compressor, or possibly from the engine intake ram air, to provide a mixed mass of air at just about 0°C. Most of the moisture in the air is condensed, and the mixed air is then used in cooling the compressed air and exhausted. The condensed water may be pumped to the turbine for cooling and may be used to cool the atmospheric air entering the first heat exchanger.

The advantages of my invention and the mode of practicing it will be clear to those skilled in the art from the succeeding detailed description of the preferred embodiment of the invention and the accompanying drawings thereof.

Figure 1:
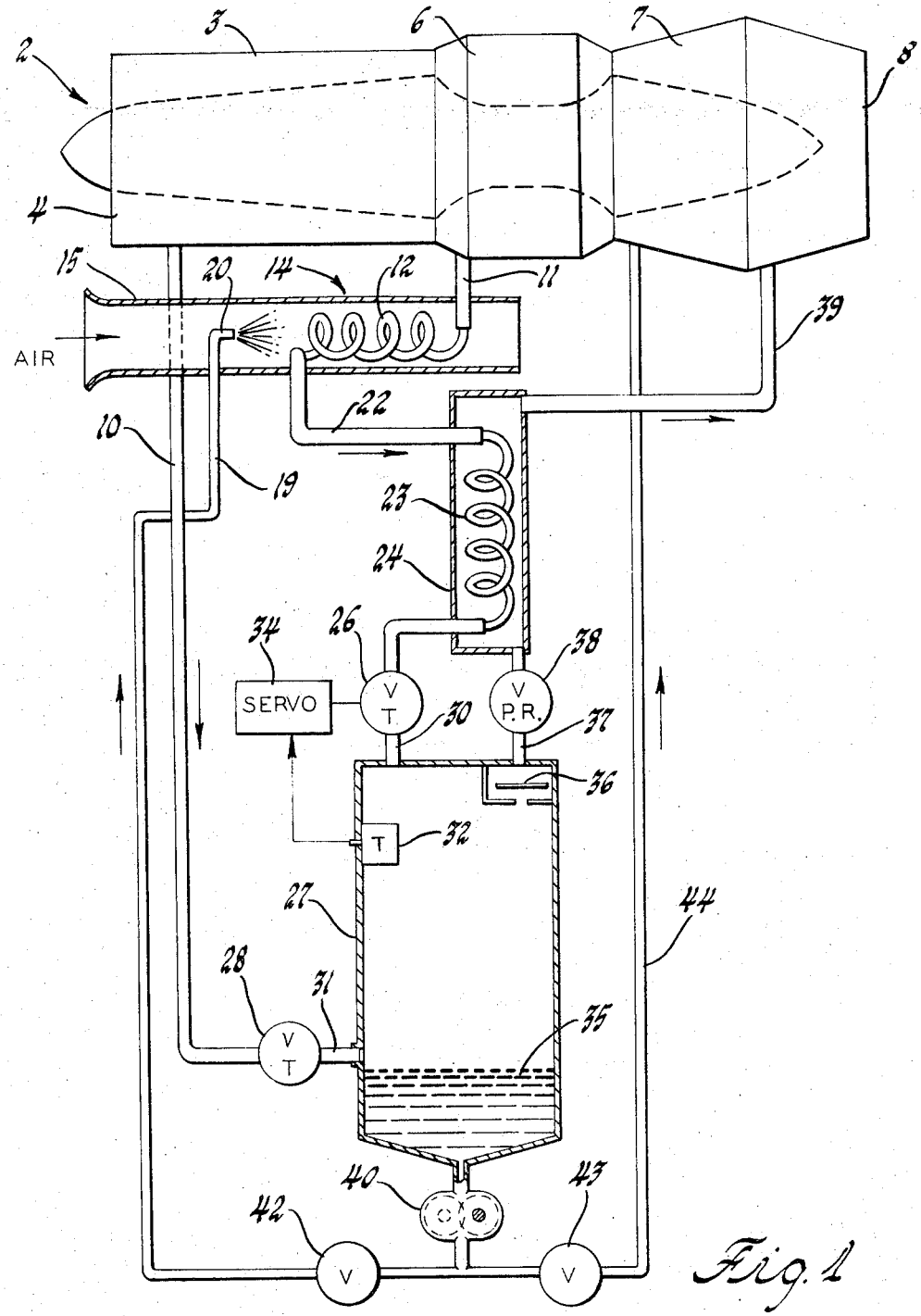
FIG. 1 is a schematic diagram of a water recovery system for a gas turbine engine.

In FIG. 1, a gas turbine engine 2, which may be a jet engine or a shaft power output engine, is illustrated as comprising a multistage compressor 3 having an air inlet at 4, combustion apparatus 6, and a turbine 7. The turbine drives the compressor through shafting (not illustrated) and may also drive an external load. The turbine exhausts through an exhaust duct 8. The structure of such engines is well known. There is no need to enlarge upon it, particularly since the details of the engine are immaterial to my invention.

Air is taken from the engine at slightly above atmospheric pressure (preferably at about 1.5 compression ratio) from a low pressure stage of the compressor through a low pressure air duct 10. In some cases air may be bled from the engine inlet if ram pressure rise is sufficient. A second flow of air is taken at substantially above atmospheric pressure (preferably 4.0 or higher compression ratio) from a higher stage of the compressor through a duct 11. As illustrated, the duct 11 is connected to the compressor outlet, but obviously it may be connected to an intermediate stage of the compressor if suitable. Duct 11 leads to a cooling coil 12 which forms part of a heat exchanger 14 for initial cooling of the compressed air which will have been warmed considerably by compression.

Figure 2:
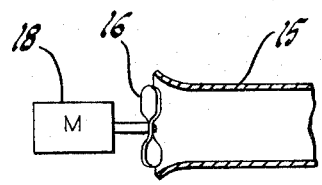
FIG. 2 is a detail view illustrating a modification.

Heat exchanger 14 includes an atmospheric air duct 15 which as illustrated in FIG. 1 has a flow of air enforced by ram due to forward motion of the vehicle in which the engine is mounted. Alternatively, as illustrated in FIG. 2, the duct 15 may have air circulated by a fan 16 driven by a motor 18. Air flowing through the duct 15 cools the compressed air to some point ordinarily above ambient atmospheric temperature.

If desired, the cooling effect may be increased by spray cooling the air flowing through duct 15 by feeding water through a pipe 19 to a spray nozzle 20 located in the duct ahead of coil 12. From the cooling coil 12, the compressed air is fed through a duct 22 to a cooling coil 23 in a second heat exchanger 24. Here the compressed air is further cooled by cold air exhausting from the water recovery apparatus, as will be described. From the cooling coil 23 the compressed air is fed to a throttling valve or expansion valve 26 through which the air is expanded to reduce its pressure and further reduce its temperature. Ordinarily this might be to somewhat below 0°C. The air thus cooled in coils 12 and 23 and expansion valve 26 is delivered to a receiver 27 which is a closed vessel to which the low pressure air from duct 10 is also supplied through a throttling valve 28 which may be used to regulate the amount of low pressure air supplied to the receiver. Valve 28 may be controlled by water level in the receiver, if desired.

The two air flows which enter the receiver through ducts 30 and 31, respectively, are mixed in the receiver to produce a mixed quantity of air at approximately 0°C. The significance of this temperature is that it is desired to condense as much as feasible of the atmospheric moisture, but the condensate must be kept in a liquid rather than a frozen condition. The amount of the compressed air admitted through throttling valve 26 may be controlled to this end by a temperature responsive element 32 controlling a servomechanism 34 which in turn controls valve 26. There is no need to go into details of a system by which the flow through inlet 30 may be reduced as temperature approaches too close to the freezing point of water. Such systems are very common.

The mixing of the two streams of air and consequent production of a body of air just above freezing temperature causes condensation or rainfall in the receiver 27, and the precipitated water is collected in the lower part of the receiver as indicated at 35. The air escapes from the receiver through conventional baffles 36 which catch and separate moisture droplets in the air, an outlet 37, and a pressure regulator valve 38. Valve 38 may serve to maintain a pressure slightly above sea level atmospheric in the receiver 27, or any other preferred pressure level. After flowing through valve 38, the exhaust air flows through the heat exchanger 24 in heat exchange relation to the cooling coil 23 and then is discharged through an exhaust duct 39 to an exhaust point, which may be in the exhaust duct 8 of the engine 2.

Conceivably, in some installations, the pressure regulating valve 38 may be set so as to maintain sufficient pressure in the receiver so that the water may be discharged to a point of use by the pressure in the receiver. However, ordinarily I would prefer to employ a water pump 40 supplied from the receiver, which may be driven as desired by any suitable power source under any desired type of control. As illustrated, the pump 40 may discharge some of the water to the spray nozzle 20 through duct 19 and a controllable valve 42. For the purpose of cooling the turbine of the engine, flow from pump 40 controlled by a valve 43 is supplied through a pipe 44 to the turbine 7.

So far as my invention is concerned, the mode of use of water for turbine cooling is entirely immaterial. By way of example, an air-water spray system such as that described in Broffitt U.S. Pat. No. 2,891,382, June 23, 1959, might be employed. Also, the water might well be used in a sweat cooling system in which the water flows from the interior of porous blades to the surface, cooling the blades, evaporating at the surface, and being carried away by the motive fluid.

My system, providing a constant supply of fresh water, suits the uses in which the water is carried away, and eliminates the need for condensers or for large quantities of stored water.

The detailed description of the preferred embodiment of the invention for the purpose of explaining the principles thereof is not to be considered as limiting or restricting the invention, as many modifications may be made by the exercise of skill in the art.

I claim:

1. A method of cooling a gas turbine engine having a multistage compressor and a turbine comprising bleeding a first flow of air at slightly above atmospheric pressure from a low stage of the compressor, bleeding a second flow of air at substantially above atmospheric pressure from a higher stage of the compressor, cooling the second flow by heat exchange to a cooling medium, further cooling the second flow of air by heat exchange with a flow of cooled air, expanding the second flow of air into a receiver to cool the air and supply the receiver with cooled low pressure air, supplying the first flow of air into the receiver and mixing the two flows in the receiver to condense and collect water from the mixed air flows and provide the said flow of cooled air for cooling the said second flow, and supplying the collected water to the turbine to cool the turbine.

2. A method of cooling a gas turbine engine having a multistage compressor and a turbine comprising bleeding a first flow of air at slightly above atmospheric pressure from a low stage of the compressor, bleeding a second flow of air at substantially above atmospheric pressure from a higher stage of the compressor, cooling the second flow of air to a temperature above atmospheric by heat exchange to atmosphere, further cooling the second flow of air by heat exchange with a flow of cooled air, expanding the second flow of air into a receiver to cool the air and supply the receiver with cooled low pressure air, supplying the first flow of air into the receiver and mixing the two flows in the receiver to cool the mixed flows to near 0°C. to condense and collect water from the mixed air flows and provide the said flow of cooled air for cooling the said second flow, and supplying the collected water to the turbine to cool the turbine.

3. A method of cooling a gas turbine engine having a multistage compressor and a turbine comprising bleeding a first flow of air at slightly above atmospheric pressure from a low stage of the compressor, bleeding a second flow of air at substantially above atmospheric pressure from a higher stage of the compressor, providing a third flow of air at substantially atmospheric condition, cooling the third flow by evaporation of water, cooling the second flow of air by heat exchange with the cooled third flow, further cooling the second flow of air by heat exchange with a fourth flow of cooled air, expanding the second flow of air into a receiver to cool the air and supply the receiver with cooled low pressure air, supplying the first flow of air into the receiver and mixing the two flows in the receiver to cool the mixed flows to near 0°C. to condense and collect water from the mixed air flows and provide the said fourth flow of cooled air for cooling the said second flow, and supplying the collected water to the third flow of air for cooling the third flow and to the turbine to cool the turbine.

4. A system for cooling a gas turbine engine having a multistage compressor and a turbine, the system comprising, in combination, means for bleeding a first flow of air at slightly above atmospheric pressure from a low stage of the compressor, means for bleeding a second flow of air at substantially above atmospheric pressure from a higher stage of the compressor, first heat exchange means for cooling the second flow of air by heat exchange to the atmosphere, second heat exchange means for further cooling the second flow of air by heat exchange with a flow of cooled air, means for expanding and thus still further cooling the second flow of air, means for mixing the still further cooled flow with the first flow to condense and discharge atmospheric water from the mixed air flows, means for conducting the mixed air flows through the second heat exchange means, means to collect the discharged water, and means for supplying the collected water to the turbine to cool the turbine.

5. A system for cooling a gas turbine engine having a multistage compressor and a turbine, the system comprising, in combination, means for bleeding a first flow of air at slightly above atmospheric pressure from a low stage of the compressor, means for bleeding a second flow of air at substantially above atmospheric pressure from a higher stage of the compressor, first heat exchange means for cooling the second flow of air by heat exchange to the atmosphere to a temperature above atmospheric, second heat exchange means for further cooling the second flow of air by heat exchange with a flow of cooled air, means for expanding and thus still further cooling the second flow of air, means for mixing the still further cooled flow with the first flow to cool the mixed flows to near 0°C. to condense and discharge atmospheric water from the mixed air flows, means for conducting the mixed air flows through the second heat exchange means, means to collect the discharged water, and means for supplying the collected water to the turbine to cool the turbine.

6. A system for cooling a gas turbine engine having a multistage compressor and a turbine, the system comprising, in combination, means for bleeding a first flow of air at slightly above atmospheric pressure from a low stage of the compressor, means for bleeding a second flow of air at substantially above atmospheric pressure from a higher stage of the compressor, means for providing a third flow of air at substantially atmospheric condition, means for cooling the third flow by evaporation of water, first heat exchange means for cooling the second flow of air by heat exchange with the cooled third flow, second heat exchange means for further cooling the second flow of air by heat exchange with a fourth flow of cooled air, means for expanding and thus still further cooling the second flow of air, means for mixing the still further cooled flow with the first flow to cool the mixed flows to near 0°C. to condense and discharge atmospheric water from the mixed air flows and provide the fourth air flow, means for conducting the fourth air flow through the second heat exchange means, means to collect the discharged water, and means for supplying the collected water to the means for cooling the third air flow and to the turbine to cool the turbine.

* * * * *